United States Patent
Preston et al.

[15] 3,664,982
[45] May 23, 1972

[54] REACTION PRODUCT OF HYDROLYZED SILOXANE AND AN IMINE POLYMER AND GLASS STRANDS COATED THEREWITH

[72] Inventors: Jerome A. Preston, Granville; Carlton J. Davis, Sr., Newark, both of Ohio

[73] Assignee: Owens-Corning Fiberglas Corporation

[22] Filed: Dec. 24, 1969

[21] Appl. No.: 884,781

Related U.S. Application Data

[63] Continuation of Ser. No. 610,487, Jan. 20, 1967, abandoned.

[52] U.S. Cl. ..................260/29.4, 117/126 GS, 161/175, 260/29.2 M, 260/33.4 SB, 260/33.6 SB, 260/824 R
[51] Int. Cl. ..................................................C08g 47/10
[58] Field of Search..............260/29.2 M, 29.2 N, 824, 29.4, 260/33.4, 33.6; 161/175; 117/126 GS

[56] References Cited

UNITED STATES PATENTS

| | | |
|---|---|---|
| 2,842,509 | 7/1958 | Shannon..........................260/29.2 |
| 3,046,242 | 7/1962 | Santelli..........................260/29.2 M |
| 3,061,567 | 10/1962 | Keil..............................260/29.2 M |
| 3,111,535 | 11/1963 | Nitsche et al...................260/29.2 M |
| 3,159,600 | 12/1964 | Watkins..........................260/46.5 E |
| 3,169,884 | 2/1965 | Marzocchi et al................260/29.2 M |
| 3,177,170 | 4/1965 | Lund............................260/29.2 M |
| 3,192,089 | 6/1965 | Clark...........................260/29.2 M |
| 3,228,903 | 1/1966 | Dennis..........................260/29.2 M |
| 3,278,476 | 10/1966 | Santelli.........................260/29.2 M |
| 3,297,476 | 1/1967 | Kane............................260/29.2 N |
| 3,510,452 | 5/1970 | Frotscher et al....................260/824 |

*Primary Examiner*—Julius Frome
*Assistant Examiner*—Arthur H. Koeckert
*Attorney*—Staeline & Overman and William P. Hickey

[57] ABSTRACT

An improved bonding material comprising a hydrolyzed siloxane and a polyimine which is dispersible in the siloxane. The coating material is preferably applied to glass fibers at forming from an aqueous solution, and the coated fibers are preferably used to strengthen a matrix resin which is fused with the coating material so that diffusion of the polyimine into the matrix resin takes place. Composites of the coated glass fibers with matrix resins that are reactive with amine hydrogen have great strength.

9 Claims, No Drawings

REACTION PRODUCT OF HYDROLYZED SILOXANE AND AN IMINE POLYMER AND GLASS STRANDS COATED THEREWITH

This is a continuation of Ser. No. 610,487, filed Jan. 20, 1967, now abandoned.

BACKGROUND OF THE INVENTION

The present invention relates to sizes that are applied to glass fibers at forming, which fibers are to be used for the reinforcing of plastics.

Monomeric silanes have been used as coupling agents heretofore for attaching resinous materials to glass fibers. The silanes found most effective heretofore have been monomers having functional organic groups thereon which chemically react and bond with the resin being reinforced by the glass fibers. Obviously, such coupling agents have limited value for achieving a bond with resins that are devoid of functional groups. With prior art materials, the strength of the bond between the fibers and the resin being reinforced is dependent upon a chemical reaction therebetween, since substantially no mechanical interlocking is achieved between the monomer and resin being reinforced.

SUMMARY

The present invention relates to a unique and improved molecular coupling structure between glass fibers and a resin which the fibers reinforce. According to the invention, a hydrolyzed siloxane polymer is molecularly intermingled with a polymerized imine, the polyimine molecules of which are adapted to and when fused with an impregnating resin, mechanically extend into and intermingle with the molecules of the impregnating resin to achieve a mechanical interlocking therewith. The polymerized imine molecule has been found to be particularly beneficial because of its highly branched nature, and because of the abundance of amine hydrogen that is distributed along the polyimine chain, one end of the polyimine chain mechanically interlocks with the polysiloxane molecules attached to the glass while the other end of the polyimine molecules, or molecules reacted therewith, mechanically interlock with the resin being reinforced. In the preferred composites, the amine hydrogen reacts both with the polysiloxane and with the resin being reinforced to produce a combination mechanical and chemical bond that penetrates both the resin being reinforced and the layer of siloxane coupling agent that surrounds and coats the surface of the glass.

DESCRIPTION OF THE PREFERRED EMBODIMENTS

As previously indicated, the present invention relates to an improved coupling between glass fibers and a resin which the fibers ultimately reinforce. According to the invention, polyimines of appreciable chain length are thoroughly dispersed throughout a hydrolyzed siloxane which attaches to the surface of the glass fibers. The polyimine chains extend out of the polysiloxanes to become interlaced with the molecular chains of the plastic that is being reinforced to thereby achieve a mechanical interlock between the siloxane layer and the layer of resin being reinforced. In some instances, the mixture of siloxane and polyimines can be applied to the fibers in a molten condition, but in the preferred embodiments they are applied to the glass fibers in the form of a solution, which most preferably is an aqueous solution. The combination of hydrolyzed siloxane and polyimine is uniquely advantageous since each are readily soluble in water. The polyimines are further advantageous in that they include primary, secondary, and tertiary imine groups closely spaced throughout the molecular chain. Not only will the highly branched molecules of polyimines interlace with the siloxanes and the resin being reinforced, but amine hydrogen is present at closely spaced intervals to achieve a chemical bond, if desired, with the laminating resin and with the siloxane. It is further believed that the imine rings react with hydroxyl groups attached to the silicon atom of the siloxane under certain conditions. Any type of laminating resin can be used since an improved mechanical bond is achieved therewith, even though no functional groups exist which will chemically bond with the amine hydrogen of the polyimine chain. Supplemental film formers having reactive groups that are reactive with amine hydrogen can be used with the siloxane-polyimine mixture to cheapen the product and provide better separation of the glass fibers prior to the time that they are mixed with the laminating resin. The laminating resin is preferably fused with the coated fibers in order to provide intermingling of the polyimine, or polyimine-supplemental film former resin chains, with the laminating resin. The supplemental film formers can therefore be polyesters, polyvinylacetates, epoxy polymers, phenolics, melamines, polyonomers, etc. or any other material which has functional groups that are reactive with amine hydrogen. The laminating resins, as previously indicated, can be of any type, as for example the generally non-reactive polyethylenes or polypropylenes, or the resins containing functional groups such as polyacrylates, polystyrenes, nylons, polyamides, polyesters, etc.

Any suitable silane can be used which will hydrolyze into siloxane chains. The silanes may in some instances have non-reactive organic portions such as monovalent alkyl groups, as for example normal propyl or normal butyl radicals, or may have any of the functional organic groups such as the amines, alpha unsaturates, chlorides, alcohols, esters, etc. The silanes will preferably, however, have three hydrolyzable groups attached to the silicon atom.

The imines can be ethylenimines, substituted ethylenimines as for example propylenimine, or can be polymers thereof.

The following examples will demonstrate the above principles.

EXAMPLE 1

35.71 parts of di-ionized water are placed into a stainless steel vessel. The vessel is equipped with an agitator which agitates the water at a rate creating a vortex. N-propyl-trimethoxy silane is slowly added to the agitated water at a rate just faster than dripping, until 11.92 parts are incorporated into the water. Glacial acetic acid is slowly added to the solution to lower the pH to approximately 4 at which point the silane is completely hydrolyzed and forms a clear solution. Approximately 0.1 percent of the glacial acetic acid based on the total weight of the solution is usually required. The temperature of the mixture is then raised to 180° F. and held at this temperature for approximately 15 minutes. The solution is then cooled to room temperature.

In another stainless steel vessel, 35.71 pounds of di-ionized water at room temperature are added. An agitator in this vessel also stirs the water at a rate which creates a vortex. 14.76 parts of polyethylenimine are added and the materials are mixed until a clear solution is formed. Glacial acetic acid is added to this vessel until the pH is lowered to between 6.8 to 7. Thereafter the contents of the first vessel at room temperature are slowly added to the second vessel also at room temperature, and the materials are mixed for 15 minutes. 0.25 parts of chloroplatinic acid are then added, and an exotherm occurs during which time the temperature rises to above 180° F. A reaction product is formed having a pH of between 5.2 and 6.2, and the solution can then be drained and stored for future use. This solution contains 60 percent solids.

A size for application to glass fibers is formed by mixing 1.3 parts of the reaction product produced above, 2 parts of hexamethoxymethyl melamine and 96.7 parts of water at room temperature. The material is thoroughly mixed, and this mixture is applied to 408 filament E glass fibers at forming which are then brought together into a strand. Thirty of these strands are brought together into a roving, which is then chopped into one quarter inch lengths. 20 parts of these chopped fibers and 80 parts of styrene acrylonitrile resin having a molecular weight of approximately 200,000 are mixed together and are placed into a 1 inch National Rubber Machinery screw extruder electrically heated to 500° F. The mixture is extruded into a quarter inch diameter cylinder which is then chopped into one quarter inch pellets. These pellets are fed to an injection molding machine also heated to 500° F., and is injection molded into a standard ASTM-D638 dog bone test specimen which when tested gives a tensile strength of 17,000 pounds per square inch. By way of comparison, the styrene acrylonitrile polymer when extruded into a test specimen without other additions, has a tensile strength of 9,300 pounds per square inch.

By way of comparison, and not according to the invention, 1.3 parts of gamma aminopropyltriethoxy silane were mixed with 2 parts of the hexamethoxymethyl melamine and 96.7 parts of water at room temperature to provide a size. This size was applied to glass fibers in the same manner indicated above. Twenty parts of these fibers were added to 80 parts of styrene acrylonitrile resin, the mixture extruded and pelletized, and then molded in the same manner given above to provide test specimens. The specimens had only a tensile strength of 13,050 psi.

EXAMPLE 2

The process of Example 1 was repeated excepting that normal propyltriethoxy silane was substituted for the silane of Example 1 and was put into solution at 160° F. instead of 180° F. The reaction product of the normal propyltriethoxy silane and the polyethylenimine when applied to fibers which are chopped and mixed with the styrene acrylonitrile resin and molded into a test specimen, all as in Example 1, gave a strength of 17,590 psi.

EXAMPLE 3

The procedure of Example 1 was repeated excepting that no catalyst was used, and an ethylenimine monomer having a molecular weight of 43.07 was substituted in like amount for the polyethylenimine of Example 1. Test specimens of this material prepared in the same manner as in Example 1 had a tensile strength of 17,980 psi.

Example 4

The procedure of Example 2 was repeated excepting that no catalyst was used and ethylenimine was used instead of the polyethylenimine, and the test specimens prepared as in Example 1 had a tensile strength of 15,600 psi.

EXAMPLE 5

The process of Example 2 was repeated excepting that no catalyst was used, a vinyltriethoxy silane was substituted for the silane of Example 2, ethylenimine was substituted for the polyethylenimine of Example 2, and the two solutions were reacted at 280° F. instead of room temperature. The strength of test specimens prepared from this material using the procedure of Example 2 was 13,700 psi.

EXAMPLE 6

The procedure of Example 1 was repeated excepting that no catalyst was used, chloropropyltrimethoxysilane was substituted for the silane of Example 1, and ethylenimine was substituted for the polyethylenimine of Example 1. Test specimens of this material prepared using the procedure of Example 1 gave a tensile strength of 11,130 psi.

EXAMPLE 7

The procedure of Example 2 was repeated excepting that gamma aminopropyltriethoxy silane was substituted for the normal propyltriethoxy silane. This silane was put into solution at 180° F instead of 160° F. Test specimens of this material prepared in the same manner as in Example 2 gave a tensile strength of 16,910 psi.

EXAMPLE 8

The process of Example 7 was repeated excepting that propylenimine was substituted for the polyethylenimine and no catalyst was used. Test specimens prepared of this reaction product prepared in the same manner given in Example 1 had a tensile strength of 14,000 psi.

EXAMPLE 9

The procedure of Example 8 was repeated excepting that vinyltriethoxy silane was substituted for the normal propyltriethoxy silane and no catalyst was used. Test specimens prepared of this reaction product had a strength of 13,800 psi.

EXAMPLE 10

The process of Example 1 was repeated excepting that propylenimine was substituted for the polypropylenimine, methacryloxypropyltrimethoxy silane was substituted for the silane of Example 1, the water was evaporated and the materials were reacted for 1 hour at 480° F. without the catalyst. The reacted materials were then dissolved in warm water which was then cooled to room temperature. Test specimens of this reaction product prepared in the same manner as in Example 1 had a tensile strength of 15,452 psi.

EXAMPLE 11

The process of Example 10 was repeated excepting that propylenimine was substituted for ethylenimine. Test specimens of this reaction product, prepared in the same manner as in Example 1, had a tensile strength of 13,200 psi.

From the above it can been seen that any unsaturated organosilanes, amino-organosilanes, acryloxy organosilanes, saturated organosilanes, and silanes having hydroxyl functional groups, as well as others can be used to produce the reaction product of the present invention. Chloro-silanes produce some of the desired reaction product, but are not preferred, since complex amines are formed, and a breakdown of the silane is obtained.

In general, reaction products useful as coupling agents on glass fibers and as reinforcing for other resins can be had using a molar ratio of the silane to the imine of from between approximately 1 to 10, and 10 to 1. The coating materials on a solids basis will preferably comprise from approximately 10 to approximately 80 percent by weight of hydrolyzed siloxane, from approximately 10 to approximately 80 percent by weight of a polymerized imine, and from 0 to 80 percent by weight of a supplemental film former that is reactive with amine hydrogen. The coating materials are preferably applied to the fibers as an aqueous solution. The solution will preferably contain from approximately 1 to approximately 16 percent by weight of solids. Most preferably, the siloxane and imine should be in approximately equal proportions, and the supplemental film former is present in an amount approximately twice that of the siloxane-imine material. In those instances where the imine is added to the siloxane as a prepolymerized material (a polyimine) having a very small percentage of imine rings, the catalyst should be present in an amount greater than approximately 0.01 percent by weight based on the siloxane-imine solids. No upper limit appears to exist on the amount of catalyst which can be used, excepting that no advantage appears to exist when more than approximately 1 percent is used. Most preferably, the catalyst should be present in an amount from approximately 0.1 to 0.5 percent by weight of the siloxane-imine solids.

The reaction products of the present invention can be used as coupling agents for bonding both thermosetting resins and thermoplastic resins to glass. The reaction products of the present invention have particular advantages as coupling agents for thermoplastic resins generally, and a number of examples will now be given.

EXAMPLE 12

20 parts of the coated glass fibers prepared as given in Example 2 above, were added to 80 parts of a polypropylene having a molecular weight of 200,000, and test bars were molded therefrom in the same manner as given in Example 1 above. These test bars had a tensile strength of 6,600 psi. when tested. Test specimens of the pure polypropylene plastic when tested in a like manner had a tensile strength of 4,400 psi. By way of control, bare glass fibers coated with 1.3 parts of gamma aminopropyltrimethoxy silane, and 2 parts of hexamethoxymethyl melamine as described in Example 1 above when mixed with the polypropylene in the same proportions given in the present example produced test bars having a tensile strength of only 5,400 psi.

EXAMPLE 13

The procedure of Example 12 was repeated excepting that nylon 66 was substituted for the polypropylene of Example 12. Test specimens prepared in the same manner had a strength of 27,000 psi. Test specimens of the nylon alone had a tensile strength of 10,000 psi. and test specimens utilizing the glass coated with gamma aminopropyltrimethoxy silane and hexamethoxymethyl melamine as described in Example 12 when molded with the nylon as described in Example 12 had a tensile strength of 24,000 psi.

EXAMPLE 14

The process described in Example 12 was repeated excepting that polystyrene having a molecular weight of approximately 250,000 was substituted for the polypropylene molding resin. Test specimens prepared using the reaction product of Example 2 as a coupling agent gave a tensile strength of 12,800 psi., while the test specimens of the polystyrene by itself gave 5,800 psi. and glass fibers coated with the gamma aminopropyltrimethoxy silane instead of the reaction product of the present invention gave only 11,000 psi. tensile strength.

The reaction products of the present invention can be applied to the glass fibers from either a water solution, as given above, or from an organic solution, or in some instances as a hot melt. Organic solutions can be prepared by boiling off the water of the reaction product and dissolving the reaction product in isopropyl alcohol, or other organic solvents such as normal butanol, xylene, toluene, etc.

Hexamethoxymethylmelamine was used in the above examples as a supplemental film former merely by way of an example of a material which will react with the polyimines and which will produce a water soluble film forming polymer which will adequately separate the fibers. Polymerized hexamethoxymethylmelamine not only is water soluble and will form a good protective film, but has desirable antifriction properties. As is indicated above, however, any suitable supplemental film former can be used which is reactive with the amine hydrogen of the polyimine. The supplemental film former may be either soluble or emusifiable in water, and most preferably soluble in water.

It will be apparent that a new and improved coating material for glass fibers has been provided which can use impure silanes of substantially any nature, even still bottoms; and which will nevertheless produce an improved bond between the surface of glass fibers and a matrix or laminating resin even though the resin is devoid of functional or chemically reactive groups.

While the invention has been described in considerable detail, we do not wish to be limited to the particular embodiments described, and it is our intention to cover hereby all novel adaptations, modifications, and arrangements thereof which come within the practice of those skilled in the art to which the invention relates.

We claim:

1. A coating composition for application to glass fibers to provide improved coupling with later applied thermoplastic and thermosetting resins, said composition comprising: a solution in a solvent selected from the group of water, isopropyl alcohol, n-butanol, xylene and toluene of the reaction product of hydrolyzed siloxane produced from a silane having three hydrolyzable groups and a water soluble highly branched chain polyamine substantially free of imine groups and produced by the polymerization of ethyleneimines, substituted ethyleneimines, or mixtures thereof, said hydrolyzed silane and polyamine being in a ratio of from approximately 1:10 to approximately 10:1, on a weight basis said reaction product being produced in the presence of a catalyst.

2. The composition of claim 1 including 0 to approximately 80 percent by weight of solids of a soluble supplemental film former reactive with amine hydrogen.

3. A glass fiber strand the filaments of which have a generally uniform coating thereon of the dried coating composition of claim 1.

4. The coating composition of claim 1 in which the composition is a solution in water.

5. The aqueous coating composition of claim 4 in which said composition includes from approximately 0.01 to approximately 1.0 percent by weight of chloroplatinic acid based on total solids.

6. The coating composition of claim 4 in which the polyamine is a polymer of ethyleneimine.

7. The coating composition of claim 4 in which the polyamine is polymerized propylene imine.

8. The coating composition of claim 4 wherein the product is obtained by the reaction of a siloxane formed by the hydrolysis of normal propyltrimethoxy silane and polyethyleneimine in the presence of chloroplatinic acid and further includes hexamethoxymethylmelamine as a film former.

9. The coating composition of claim 2 in which the supplemental film former is water soluble.

* * * * *